US005497621A

United States Patent [19]

Mallett

[11] Patent Number: 5,497,621

[45] Date of Patent: Mar. 12, 1996

[54] PLASTIC RESERVOIR

[75] Inventor: Dudley C. Mallett, Blackheath, England

[73] Assignee: Fenner Fluid Power, a Division of Fenner, Inc., Rockford, Ill.

[21] Appl. No.: 337,106

[22] Filed: Nov. 10, 1994

[51] Int. Cl.[6] .............................. F16D 31/00; F16D 31/02

[52] U.S. Cl. .................................. 60/325; 60/477; 92/142

[58] Field of Search .............................. 60/325, 408, 477, 60/478, 479, 480, 481, 482, 583; 92/142; 220/681, 692, 693

[56] References Cited

U.S. PATENT DOCUMENTS

| | | | |
|---|---|---|---|
| 2,907,486 | 10/1959 | Perez | 220/693 X |
| 2,928,243 | 3/1960 | Albright | 60/477 X |
| 4,472,943 | 9/1984 | Grabill | 60/585 |
| 5,261,235 | 11/1993 | Shellhause | 60/583 X |
| 5,282,499 | 2/1994 | Shaw et al. | 60/583 X |
| 5,325,981 | 7/1994 | Klomhaus et al. | 220/212 |

*Primary Examiner*—Edward K. Look
*Assistant Examiner*—Hoang Nguyen
*Attorney, Agent, or Firm*—Leydig, Voit & Mayer, Ltd.

[57] ABSTRACT

A plastic reservoir adapted for use with a hydraulic power pack. The reservoir includes a plastic body and a substantially plastic mounting ring which is joined to the plastic body of the reservoir. The mounting ring includes a metal reinforcing ring which is encapsulated in the plastic portion of the mounting ring.

10 Claims, 1 Drawing Sheet

PLASTIC RESERVOIR

BACKGROUND OF THE INVENTION

This invention relates generally to a reservoir for holding liquids such as hydraulic fluids and, more specifically, to a reservoir having an end portion with a relatively large opening adapted to be mounted to, for example, a hydraulic manifold.

The invention is especially useful in a hydraulic power pack of the type having a hydraulic pump located inside the reservoir. In this instance, the open end portion of the reservoir is sized to fit over the pump prior to being secured to the manifold.

A generally cylindrical mounting ring is either joined to or integrally formed at the open end of the reservoir. The mounting ring is typically adapted to receive threaded fasteners for securing the reservoir to the manifold. An O-ring establishes a circumferential seal between the internal cylindrical surface of the mounting ring and an upwardly projecting cylindrical portion of the manifold to seal the open end of the reservoir.

Either plastic or steel reservoirs can be used for storing hydraulic fluid in a hydraulic power pack. Plastic reservoirs, however, offer several advantages over comparable steel reservoirs. Plastic reservoirs are relatively lightweight and will not corrode. In addition, plastic reservoirs can be made from a translucent material to permit a quick visual check of the level of oil in the reservoir. Despite these advantages, plastic reservoirs have not been widely accepted for use in prior hydraulic power packs.

The mounting ring of the reservoir is subjected to continuous forces that tend to expand the cylindrical portion of the mounting ring. Specifically, the radial squeeze on the O-ring causes an outwardly directed force on the cylindrical portion of the mounting ring. While this force is relatively low, over time, the continuous nature of the force caused by the O-ring, combined with the heating cycles experienced during normal operation of the power pack, will cause a mounting ring which has been made from a common plastic compound to relax and deform outwardly. In those instances where the reservoir is either above or horizontally level with the manifold, at least a portion of the mounting ring is subjected to additional outwardly acting forces due to hydrostatic pressure caused by the weight of the fluid in the reservoir. Eventually, relaxation of the mounting ring will result in failure of the circumferential seal and leakage of hydraulic fluid from the reservoir. For this reason, prior mounting rings are typically made from a metal having sufficient strength and stiffness to withstand the continuous forces of the open end of the reservoir.

Steel mounting rings are easily integrated with steel reservoirs. For example, a steel mounting ring can be welded to a steel body. Alternately, a steel mounting ring may be integrally formed at the open end portion of a steel reservoir. It is difficult, however, to secure a steel mounting ring to a plastic body without the use of an additional sealing arrangement between the body and the mounting ring. As a result of the need for a steel mounting ring and the difficulty in securing a steel mounting ring to a plastic body, prior reservoirs for power packs are typically made from steel or other suitable metal.

SUMMARY OF THE INVENTION

The general aim of the present invention is to provide a new and improved plastic reservoir for use in a hydraulic power pack.

A more detailed objective is to achieve the foregoing by providing a mounting ring having a plastic portion which is capable of being bonded to a plastic reservoir body and having a metal reinforcing ring which is encapsulated in the plastic portion. The metal ring stiffens the plastic portion of the mounting ring to prevent the mounting ring from deforming outwardly so as to maintain the integrity of a circumferential seal established at the internal periphery of the mounting ring.

Another detailed objective of the invention is to provide outwardly extending metal projections which are formed integrally with the metal ring and which are encapsulated in substantially plastic mounting tabs for reinforcing the mounting tabs.

These and other objects and advantages of the invention will become more apparent from the following detailed description when taken in conjunction with the accompanying drawings.

Figure 1:
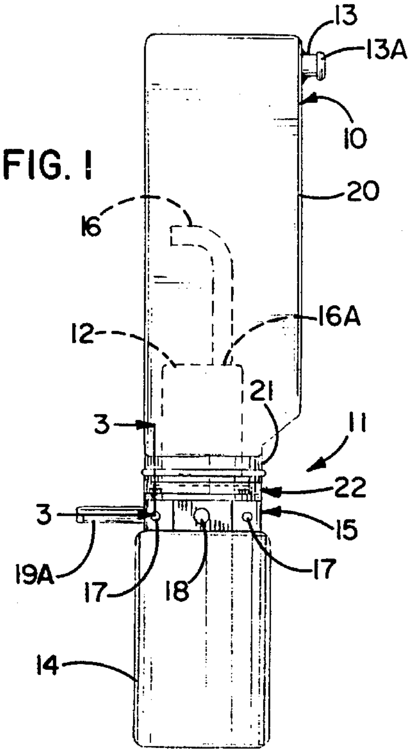
FIG. 1 is a side view of a typical hydraulic power pack equipped with a new and improved plastic reservoir incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in a plastic reservoir 10 (FIG. 1) which is especially suitable for use in a hydraulic power pack 11.

Figure 2:
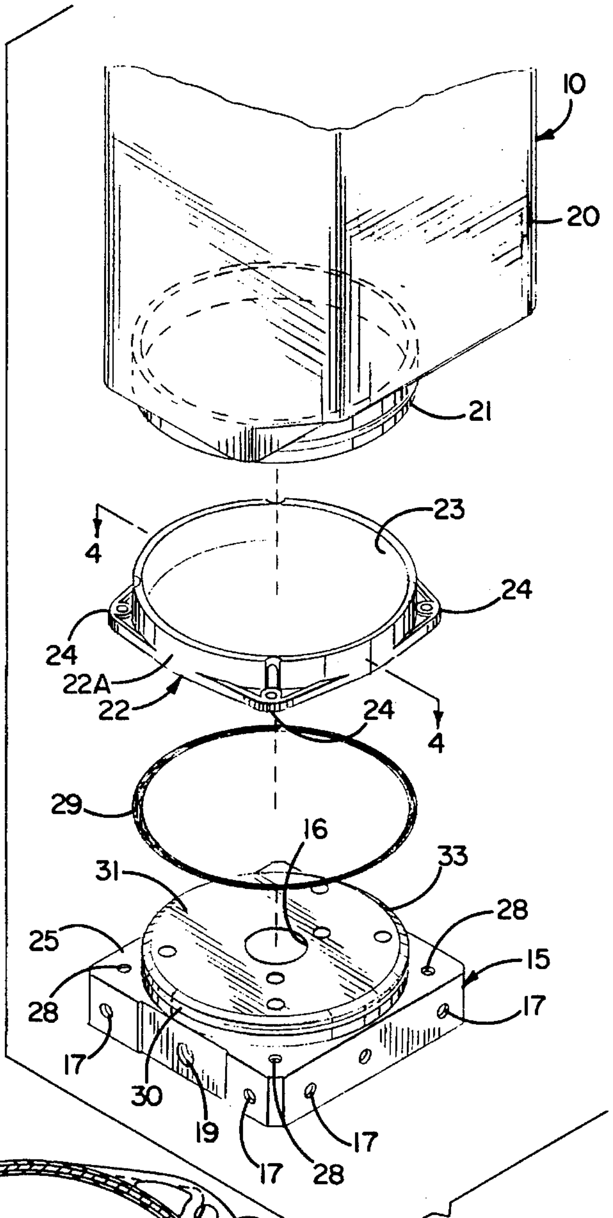
FIG. 2 is an exploded perspective view of certain parts of the hydraulic power pack.
Figure 3:
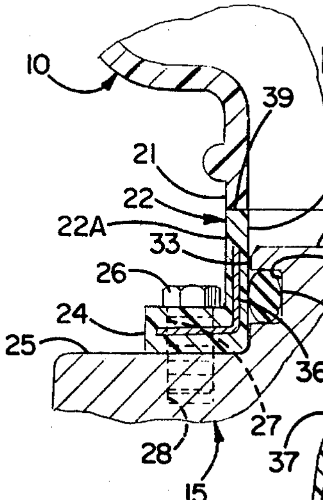
FIG. 3 is an enlarged fragmentary cross-sectional view taken substantially along the line 3—3 of FIG. 1.

The hydraulic power pack 11 includes the reservoir 10, a rotary-type hydraulic pump 12, an electric motor 14 and a manifold 15. The reservoir and the pump are secured to the manifold, the pump being located inside the reservoir. The motor is secured to the manifold oppositely of the pump. The output shaft (not shown) of the motor extends through an opening 16 (FIG. 2) in the manifold and is coupled to the input shaft (not shown) of the pump. Threaded openings 17 are spaced around the outer periphery of the manifold and are adapted to receive threaded fasteners for mounting the hydraulic power pack to a machine or other support member.

During normal operation of the hydraulic power pack 11, the pump 12 is operable to draw hydraulic fluid from the reservoir 10 and to deliver a supply of pressurized hydraulic fluid to a hydraulic circuit. Specifically, electric power is supplied to the motor 14 which, in turn, drives the pump. The pump draws fluid from the reservoir through an inlet opening 16A. The pump delivers pressurized fluid to a port formed in the manifold 15 whereupon the fluid flows through internal passages formed in the manifold and to an outlet port 19. A hydraulic line 19A which is connected to the outlet port 19 delivers the pressurized hydraulic fluid to the hydraulic circuit.

The reservoir 10 is filled with hydraulic fluid through a fill port 13 and stores the supply of hydraulic fluid for the pump 12. The volumetric capacity of the reservoir is greater than the volumetric capacity of the closed hydraulic system to insure that, assuming that the reservoir was full before the motor was started, there is an adequate supply of fluid available for use by the pump to pressurize and fill the system. The reservoir is initially filled by simply pouring fluid into the reservoir through a fill port 13. The reservoir is vented to ambient through the breather cap 13A which closes the fill port.

Typically, the power pack 11 is used in a closed hydraulic system where a limited volume of hydraulic fluid is needed in the system. For example, the power pack may be utilized to extend a hydraulic cylinder. When the electric motor 14 is turned on, the hydraulic pump 12 pressurizes the cylinder. Hydraulic fluid then flows from the power pack to the cylinder as the cylinder extends. When the cylinder reaches the end of its stroke, hydraulic fluid stops flowing from the power pack. A release valve is typically located in a return line connecting the cylinder to the return port 18 of the power pack to release the pressure from the cylinder. The hydraulic fluid is then returned to the reservoir by way of the return port and internal passages in the manifold 15.

The power pack 11 is illustrated in a vertical position with the reservoir 10 above the manifold 15 and the pump 12, including the inlet to the pump 16A, is immersed in hydraulic fluid. In many cases, however, the power pack may be mounted in a generally horizontal position with the pump only partially immersed in hydraulic fluid. In this instance, a pipe or tubing 16 is secured to the inlet 16A of the pump and bent in a manner so that the open end of the tubing is always immersed in the hydraulic fluid. Alternately, the reservoir may be located below the manifold and the tubing will extend generally downwardly so that, again, the open end of the tubing is immersed in the fluid. Advantageously, the fill port 13 for filling the reservoir with hydraulic fluid is located on the reservoir according to the intended orientation of the reservoir. Specifically, an opening is formed in the reservoir in a location that will always be above the level of the fluid in the reservoir. The fill port is then welded or otherwise secured to that opening. In this way, the fill port is always positioned above the maximum level of fluid in the reservoir.

The reservoir 10 is formed with a body 20 and an open end portion 21 in the form of a generally cylindrical neck. A generally cylindrical mounting ring 22 having an internal cylindrical surface 23 projects axially from the neck portion 21 of the reservoir. The mounting ring is normally bonded or welded to the neck portion 21. Alternately, the mounting ring may be integrally formed at the lower end portion of the reservoir. The mounting ring and the neck portion of the reservoir are adapted to fit over the pump so that the mounting ring may be located adjacent the manifold 15.

Typically, the mounting ring 22 is formed with integral and angularly spaced ears or mounting tabs 24 for securing the reservoir 10 to the manifold 15. The mounting tabs are adapted to mate with a mounting flange 25 of the manifold. The tabs extend generally radially relative to the neck portion 21 and are formed with openings 27 which align with threaded openings 28 in the mounting flange 25. The reservoir is secured to the manifold by threaded fasteners 26 which are slidably received in the openings 27 and which are threaded into the openings 28. Alternately, the reservoir may be secured to the manifold by any suitable means such as by forming an internal thread on the mounting ring to mate with an external thread on the cylindrical portion 31 of the manifold or by providing for fasteners inserted radially inwardly through the mounting ring and received in threaded openings in the cylindrical portion of the manifold.

A resilient preformed gasket or O-ring seal 29 prevents leakage of hydraulic fluid from the reservoir 10. The O-ring is located in a circumferentially extending groove 30 formed in an upwardly extending cylindrical portion 31 of the manifold 15. The external cylindrical surface 33 of the portion 31 is slidably received into the cylindrical portion or neck ring 22A of the mounting ring 22 so that the O-ring establishes a radial seal against the internal cylindrical surface 23 of the neck ring.

Prior neck rings 22A made from common plastic compounds are generally unable to withstand the outwardly directed forces acting on the neck ring. Specifically, prior plastic neck rings tend to expand due to the radial force of the O-ring resulting from the radial squeeze on the O-ring. Eventually, the radial squeeze between the neck ring and the O-ring is reduced and hydraulic fluid leaks from the reservoir. Relaxation of the neck ring is accelerated by the normal heating of the fluid in the reservoir when the pump is running and by the hydrostatic pressure head that develops when at least a portion of the neck ring is located below the fluid in the reservoir. As a result, prior mounting rings 22 and prior reservoirs are typically made from a suitable metal.

Figure 4:
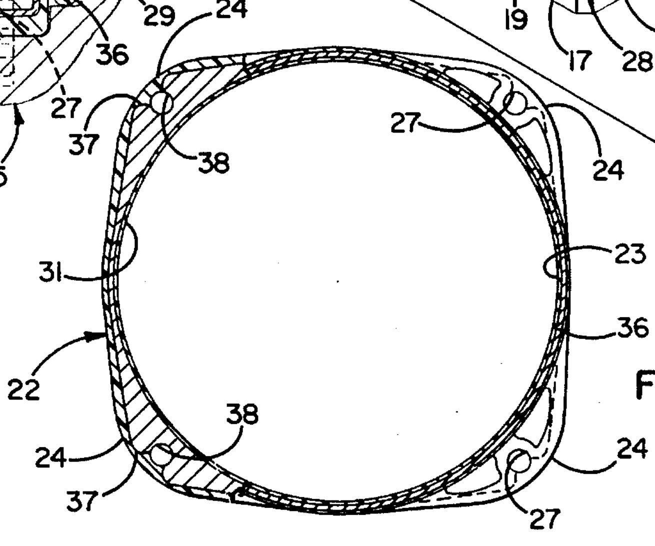
FIG. 4 is an enlarged cross-sectional view taken substantially along the line 4—4 of FIG. 1.

In accordance with the present invention, a metal ring 36 (FIG. 4) is encapsulated in a substantially plastic neck ring 22A. The metal ring reinforces the plastic portion of the mounting ring 22 so that the substantially plastic neck ring has sufficient stiffness and hoop strength to withstand long term exposure to normally encountered radially directed forces in the reservoir 10 and to repeated heating cycles of the fluid in the reservoir. Further, the plastic portion of the mounting ring may be easily bonded or secured to the neck portion 21 of a plastic reservoir. As a result, a plastic reservoir may be used in the hydraulic power pack 11. Preferably, the plastic reservoir is made from a translucent plastic so that the level of the fluid can be visually monitored. This obviates the need for a dipstick arrangement or for a visual sight-glass to check the fluid level in the reservoir.

More specifically, the metal reinforcing ring 36 is formed as a continuous ring. Preferably, the metal ring is completely encapsulated in plastic. In this way, the plastic portion of the mounting ring 22 protects the metal ring from corrosion. Further, the plastic internal periphery of the mounting ring 22 defines the smooth cylindrical surface 23 which engages the O-ring 29.

The upper plastic portion 39 of the mounting ring 22 is joined to the neck portion 21 of the plastic reservoir 10 by heat bonding, ultrasonic bonding or welding, adhesive bonding, or any other suitable means.

When the reservoir 10 is secured to the manifold 15, the metal reinforcing ring 36 is axially aligned with the O-ring 29 and extends axially, in both directions, beyond the O-ring. The reinforcing ring is sized to insure that the hoop strength and stiffness of the mounting ring 22 will withstand the weight of hydraulic fluid in the reservoir without substantial deformation. In this way, the reinforcing ring maintains the integrity of the radial seal between the manifold 15 and the mounting ring.

Preferably, the metal ring 36 is formed having integral and radially outwardly extending metal projections 37 which are completely encapsulated in plastic. The plastic-encapsulated metal projections 37 define the mounting tabs 24. The metal projections are formed with openings 38 that align with the openings 27 in the mounting tabs for slidably receiving the fasteners 26. In this way, the fasteners 26 will clamp onto the encapsulated metal projections when the reservoir is secured to the manifold 15 so that the metal projections reinforce the mounting tabs.

From the foregoing, it will be apparent that the present invention brings to the art a new and improved plastic reservoir 10 having a substantially plastic mounting ring 22 capable of being welded or bonded to the neck portion 21. By virtue of an encapsulated metal reinforcing ring 36, the strength and stiffness of the substantially plastic mounting ring are significantly enhanced. The mounting ring is capable of withstanding long term exposure to outwardly directed radial forces and to the normal heating of the hydraulic fluid in the reservoir 10 so as to maintain the integrity of a circumferential seal at the internal surface of the mounting ring.

I claim:

1. A reservoir adapted to hold a supply of fluid and to be secured to a member, said reservoir comprising a plastic body having an open end portion, a mounting ring having a plastic portion joined to said open end portion, and means for securing said mounting ring to said member, said mounting ring including a metal ring substantially encapsulated in said plastic portion for reinforcing said plastic portion.

2. A reservoir as recited in claim 1 in which said body is formed from a translucent material for visually monitoring the level of fluid in said body.

3. A reservoir as recited in claim 1 wherein said means includes a plurality of threaded fasteners, wherein said plastic portion includes a plurality of integrally formed and outwardly extending mounting tabs having openings adapted to receive said fasteners and wherein said reinforcing ring includes a plurality of integrally formed and outwardly extending metal projections substantially encapsulated in said mounting tabs for reinforcing said mounting tabs.

4. A reservoir as recited in claim 3 wherein said outwardly projecting metal portions include openings adapted to slidably receive said fasteners.

5. A power pack for supplying pressurized fluid, said power pack comprising a reservoir having an open end portion and having a plastic body for storing a supply of fluid, a separately formed mounting ring having a plastic portion joined to and projecting axially from said open end portion, a manifold having outlet means, means for securing said mounting ring to said manifold, means for establishing a seal between said manifold and said mounting ring, and a pump secured to said manifold and operable to receive fluid from said reservoir and to supply pressurized fluid to said outlet means, said mounting ring having a metal ring at least partially encapsulated in said plastic portion for reinforcing said plastic portion.

6. A power pack as recited in claim 5 wherein said manifold includes a mounting flange having a plurality of threaded openings, said securing means comprising a plurality of threaded fasteners received in said threaded openings, and wherein said metal ring includes integrally formed and outwardly extending projections having openings adapted to slidably receive said threaded fasteners.

7. A power pack as recited in claim 6 wherein said projections are at least partially encapsulated in plastic.

8. A power pack as recited in claim 5 wherein said sealing means comprise a resilient preformed gasket engaging the internal periphery of said mounting ring, said seal being axially aligned with said reinforcing ring.

9. A power pack as recited in claim 8 in which said internal periphery which engages said seal is defined by part of said plastic portion.

10. A power pack for supplying pressurized fluid, said power pack comprising a reservoir having an open end portion and having a plastic body for storing a supply of fluid, a separately formed plastic mounting ring bonded to said open end, said plastic mounting ring having a generally cylindrical inner surface and having a plurality of openings, a manifold having outlet means and a cylindrical sidewall and having a plurality of threaded openings aligned with said openings in said mounting ring, said sidewall extending into said plastic mounting ring and having a circumferentially extending groove, a resilient seal located in said groove and engaging said inner surface for sealing between said manifold and said mounting ring, a plurality of threaded fasteners slidably received in said openings in said mounting ring and threaded into said threaded openings to secure said reservoir to said manifold, a pump secured to said manifold, said pump being operable to receive fluid from said reservoir and to supply pressurized fluid to said outlet means, and a metal ring encapsulated in said plastic mounting ring and axially aligned with said seal for reinforcing said plastic mounting ring.

* * * * *